United States Patent [19]

Maxworthy

[11] Patent Number: 5,062,595
[45] Date of Patent: Nov. 5, 1991

[54] DELTA WING WITH LIFT ENHANCING FLAP

[75] Inventor: Tony Maxworthy, Culver City, Calif.

[73] Assignee: University of Southern California, Los Angeles, Calif.

[21] Appl. No.: 635,800

[22] Filed: Jan. 2, 1991

Related U.S. Application Data

[63] Continuation of Ser. No. 515,312, Apr. 26, 1990, abandoned, which is a continuation of Ser. No. 221,320, Jul. 19, 1988, abandoned.

[51] Int. Cl.$^5$ .................................................. B64C 3/50
[52] U.S. Cl. ...................................... 244/214; 244/213
[58] Field of Search ................ 244/199, 213, 214, 206, 244/201, 204, 90 R

[56] References Cited

U.S. PATENT DOCUMENTS

| 2,448,966 | 9/1948 | Fales | 244/199 |
|---|---|---|---|
| 3,170,657 | 2/1965 | Riebe et al. | 244/162 |
| 3,471,107 | 10/1969 | Ornberg | 244/199 |
| 4,485,992 | 12/1984 | Rao | 244/214 |
| 4,739,957 | 4/1988 | Vess et al. | 244/199 |

FOREIGN PATENT DOCUMENTS

9693XI 3/1957 Fed. Rep. of Germany ...... 244/199

OTHER PUBLICATIONS

Video Cassette of 1986 CNN Broadcast.
Maxworthy, Tony, "Experiments on the Weis-Fogh Mechanism of Lift Generation by Insects in Hovering Flight, Part 1, Dynamics of the 'fling'", Journal of fluid Mechanics, 1979, vol. 93, Part 1, pp. 47-63.
Maxworthy, Tony, "The Fluid Dynamics of Insect Flight", Annual Review of Fluid Mechanics, 1981, Chapter 13, pp. 329-350.
Spedding, G. R., Maxworthy, Tony, & Rignot, E., "Unsteady Vortex Flows Over Delta Wings", Air Force Office of Scientific Research, Colorado Springs, Colorado, Jul. 1987.
Spedding, G. R. and Maxworthy, Tony, "The Generation of Circulation and Lift in a rigid-dimensional fling", Journal of Fluid Mechanics, 1986, vol. 165, pp. 247-272.

*Primary Examiner*—Joseph F. Peters, Jr.
*Assistant Examiner*—Anne E. Bidwell
*Attorney, Agent, or Firm*—Pretty, Schroeder, Brueggemann & Clark

[57] ABSTRACT

A wing assembly comprising a substantially delta shaped wing having a substantially delta shaped flap rotatably connected to the wing's leading edge is disclosed for providing significantly enhanced lift and maneuverability to an aircraft or the like. The flap is rapidly rotated under flow conditions from a position where it is substantially against and parallel to the wing top surface to a position where it is away from and substantially normal to the surface to create large, stable vortices with high circulation over the wing. The flap remains in this steady position during flight for a specified period of time. Alternatively, the flap is continuously and rapidly oscillated under flow conditions from a position where it is substantially against the wing top surface to a position where it is away from it. This unsteady deployment of the flap with respect to the wing continues for a desired time period during flight. It is contemplated that the wing assembly of this invention will have application in aircraft, such as supermaneuverable aircraft, and that the principles of this invention will have use on other flow dependent surfaces as well.

23 Claims, 2 Drawing Sheets

DELTA WING WITH LIFT ENHANCING FLAP

This invention was made with Government support under Grant AF03R-85-0318 awarded by the Air Force Office of Scientific Research.

The Government has certain rights in this invention.

This application is a continuation of application Ser. No. 515,312, filed Apr. 26, 1990, now abandoned, which is a continuation of application Ser. No. 221,320, filed July 19, 1988, now abandoned.

BACKGROUND OF THE INVENTION

This invention relates to wings for use with aircraft and the like having flaps to improve the performance of the aircraft and, more particularly, to a delta wing having a delta flap to provide enhanced lift capabilities to the aircraft.

The generation of unsteady leading edge separation vortices with relatively high circulation has been known for some time to occur, for example, in association with insect wings during flight and in some geometries of turbomachinery. In some situations, it has been observed that the efficiency of the lift and thrust generation of these processes may be significantly increased by the interaction of the lifting surface with the unsteady separation vortex or vortices over the surface. The practical application of this information to aerofoils, such as aircraft wings and the like, has been contemplated and the subject of on going studies and experiments.

The relatively recent development of super-maneuverable aircraft has created a need for aircraft wings having dramatically increased lift and maneuverability characteristics to satisfy the more demanding flight capabilities of the aircraft. In the past, the deployment of flaps and other known mechanisms has been tried in both experimental and theoretical investigations in an attempt to produce improved lift and maneuverability as compared to conventional wing technology. For example, the broad concept of a flap positioned at or near the leading edge of the wing has been contemplated as one possible means for achieving the desired results. However, prior attempts at flap deployment in wings have yielded disappointing results. Other existing wing technology is not generally designed for use in super-maneuverable aircraft or other aircraft in which enhanced lift and maneuverability is desired.

Accordingly, there has existed a definite need for a wing having structure especially adapted for use with aircraft, such as super-maneuverable aircraft and the like, that will provide enhanced lift and maneuverability of the aircraft. The present invention satisfies this need and provides further related advantages.

SUMMARY OF THE INVENTION

The present invention provides a wing assembly for use with aircraft, such as super-maneuverable aircraft and the like, having a flap designed to increase the lift and maneuverability of the aircraft. The wing assembly comprises a substantially triangular or delta shaped wing having a substantially triangular or delta shaped flap attached to the wing's leading edge. Steady and unsteady deployment of the flap with respect to the wing during flight provides significantly enhanced lift and maneuverability as compared to a wing without the flap. The wing assembly of this invention further more is intended to be relatively simple in construction and reliable in operation and result.

The wing assembly comprises a delta wing having a leading edge, a trailing edge and a side edge for connection, for example, to an aircraft. A delta flap has its leading edge rotatably connected to the leading edge of the wing. This allows the flap to rotate with respect to the top surface of the wing. The flap may be connected to the wing by hinges or other suitable means and may be operated hydraulically, pneumatically or by electric drive mechanisms.

Under flow conditions, such as during flight of the aircraft, steady and unsteady deployment of the flap creates large, stable vortices with high circulation over the wing. This translates into a wing having improved lift capabilities and, thus, an aircraft with enhanced lift and maneuverability.

In one aspect of the invention, the flap is rapidly rotated under flow conditions from a position where the flap is substantially against and parallel to the top surface of the wing to a position where it is away from and substantially normal to the wing surface. The flap remains in this fixed or steady position during flight for a specified period of time. The precise angle of the flap with respect to the top surface of the wing may be selected as desired. It has been found that a fixed flap angle of between approximately 65 to 90 degrees results in maximum lift generation, which is substantially twice the lift generation of a delta wing without the flap.

In another aspect of the invention, the flap is continuously and rapidly oscillated under flow conditions from a position where the flap is substantially against and parallel to the top surface of the wing to a position where the flap is away from and substantially normal to the wing surface. This oscillation or unsteady deployment of the flap with respect to the wing continues for a desired time period during flight and may, for example, comprise oscillation in a sinusoidal motion. The minimum and maximum flap angles for each cycle of oscillation may be selected as desired, from a point where $B_{min}=0$ degrees to $B_{max}=90$ degrees, where B is the angle of the flap with respect to the top surface of the wing. It has been found that a flap oscillation cycle where the minimum flap angle is approximately 0 degrees and the maximum flap angle is approximately 70 degrees creates maximum lift generation and a leading edge vortex circulation having approximately three times the value of a delta wing without a flap.

As noted above, the increase in lift provided by either steady or unsteady deployment of the flap is significantly greater than for a delta wing without a flap. It is contemplated that wing assemblies of the present invention will have application in aircraft, such as super-maneuverable aircraft and the like. These aircraft are capable of flying at relatively high speeds, and the use of the delta wing—delta flap assembly of the present invention with such aircraft to improve their lift and maneuverability is expected. It also is contemplated that the principles of this invention will have use on control fins on ships, submarines and various marine craft. Other potential applications include equipping helicopter blades or ship propellers with flaps to provide increased lift and maneuverability.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the wing assembly of the present invention. In such drawings.

DETAILED DESCRIPTION OF THE PREFERRED EMBODIMENT

Figure 1:
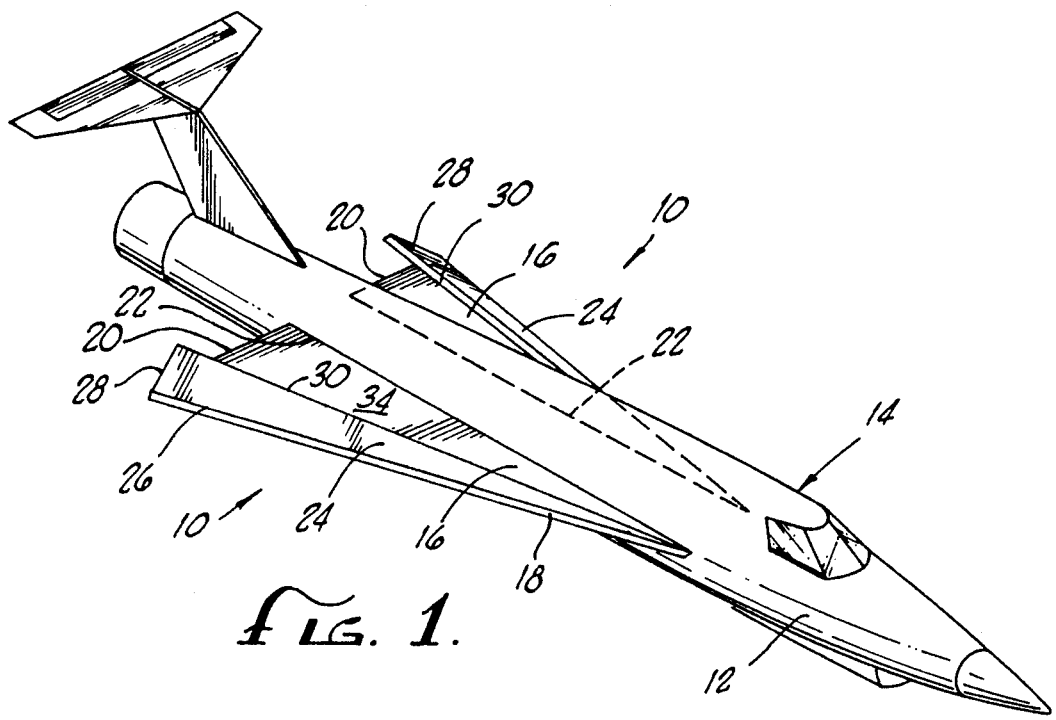
FIG. 1 is a perspective view of an exemplary aircraft embodying the wing assembly of the present invention.

As shown in the exemplary drawings, the present invention is embodied in a wing assembly, generally referred to by the reference numeral 10, for use with aircraft or the like. The wing assembly includes a wing having a leading edge flap for steady and unsteady deployment to significantly increase the lift and maneuverability of the aircraft. The wing assembly of the present invention furthermore is intended to be relatively simple in construction and reliable in use and operation.

Referring to FIG. 1, two wing assemblies 10 of the present invention are shown connected on opposite sides of the fuselage 12 of an exemplary aircraft 14. Although two such wing assemblies are shown, only one will be described since both are substantially identical in structure, function and operation. It should be understood that the aircraft depicted in the drawings is for the purpose of illustration only and that the invention may be used with other types and shapes of aircraft and other apparatus subject to fluid flow. Therefore, the invention should not be considered as being limited to applications involving aircraft. Specific examples of applications for the wing assembly of this invention are discussed below.

The wing assembly 10 comprises a substantially triangular shaped wing 16 having a leading edge 18, a trailing edge 20 and a side edge 22 for connection to the aircraft fuselage 12. In the preferred embodiment illustrated in the drawings, the wing 16 is a standard delta wing, but other swept-back wing configurations are possible. It also is anticipated that the wing shape may be softened somewhat, for example, by curving the wing leading edge 18 to more closely follow known aerodynamic design considerations. The wing 16 is connected to the aircraft 14 in a known manner, for example, by rivets or other types of aircraft fasteners, which are not described further because they do not form a part of the present invention.

The wing assembly 10 further comprises a substantially triangular shaped flap 24 having a leading edge 26 rotatably connected to the leading edge 18 of the wing 16. The flap 24 is shown in a partially open state in the drawings. In the preferred embodiment, the flap is a standard delta flap with a trailing edge 28 and side edge 30, as shown in FIG. 1. The streamwise, i.e., nose to tail, length of the flap leading edge 26 preferably is the same as the length of the wing leading edge 18. The spanwise, i.e. side to side, length of the flap trailing edge 28 is smaller than the length of the wing trailing edge 20. As a result, the flap 24 is smaller in surface area than the wing 16. A flap to wing semispan ratio of approximately 0.45 to 1 has been designed by the inventor and tested in extensive laboratory experiments which have yielded the results disclosed herein. However, smaller flaps have been tested in a preliminary fashion and have yielded similar results.

The flap 24 is rotatably connected to the wing 16 and may be connected in this manner, for example, by hinges 32 or other suitable means. For aircraft, the wing and flap should be constructed from conventional aircraft materials, including lightweight aerodynamic materials, such as aluminum, titanium, composite materials and other suitable lightweight materials.

Figure 2:
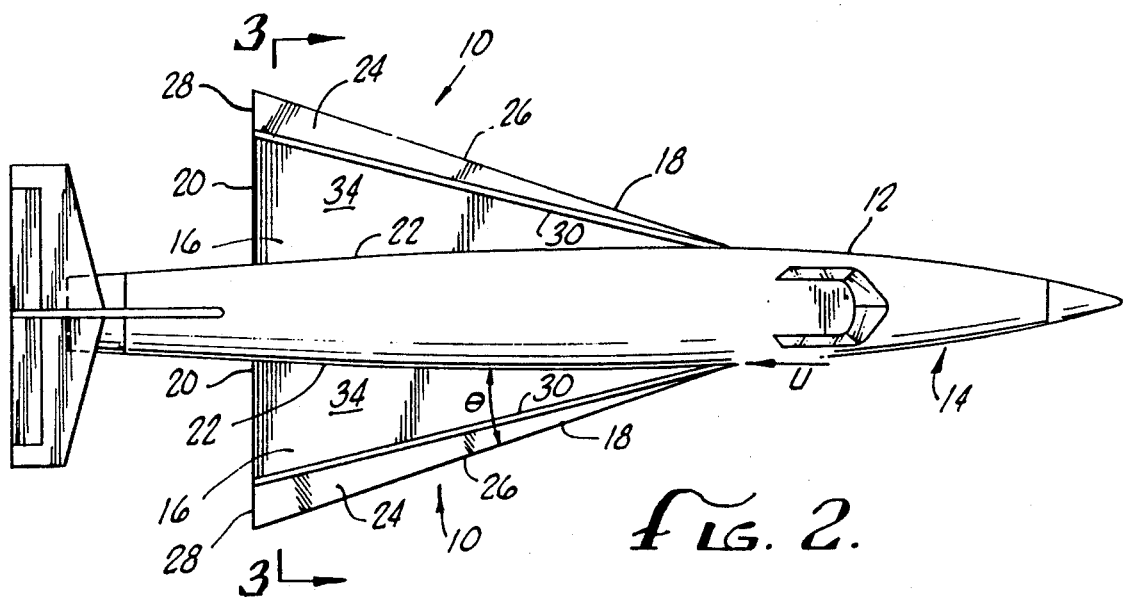
FIG. 2 is a top plan view of the aircraft an wing assembly.

FIG. 2 is a top plan view of the aircraft 1 and wing assembly 10 showing the top surface 34 of the wing 16 in greater detail. The symbol $\theta$ (theta) denotes the sweep angle of the wing defined by the angle between the side edge 22 and the leading edge 18 of the wing. In the preferred embodiment that has been experimentally tested in the laboratory, the sweep angle is approximately 17 degrees, but it may be varied as desired depending upon the particular application involved. The arrow U designates the direction of airflow over the wing assembly. In flight, therefore, the aircraft travels in a direction opposite the arrow.

Figure 3:
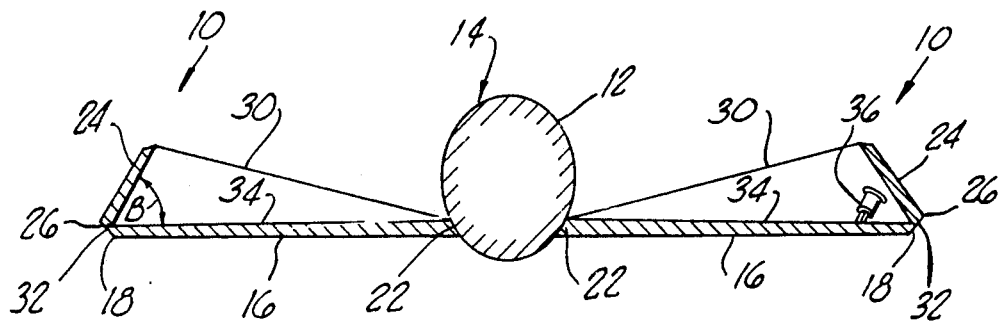
FIG. 3 is a rear elevational view of the aircraft and wing assembly, taken substantially along line 3—3 of FIG. 2.

FIG. 3 is a cross-sectional view illustrating the relative positions of the aircraft fuselage 12, wings 16 and flaps 24. As noted above, each flap is adapted for rotation with respect to the wing 16. This rotational motion to the flap may be provided by hydraulic, pneumatic or electric drive mechanisms, or other suitable means, generally referred to by the reference numeral 36, for rapidly rotating the flap with respect to the wing as explained in more detail below. If desired, the top surface 34 of the wing 16 may have a recessed area (not shown) for receiving the flap 24 and to provide a substantially flush top surface when the flap is retracted against the top surface of the wing. The doubled headed arrow designated by the symbol $\beta$ (beta) represents the angle of the flap with respect to the wing.

In accordance with the present invention, steady and unsteady deployment of the flap 24 with respect to the wing 16 creates a relatively large, stable vortex during fluid flow over the wing. This vortex has a very high circulation component and a strong three-dimensional axial flow component along the vortex core which removes excess vorticity from the core, transporting it into the wake. This results in increased lift to the wing 16 and, thus, the aircraft 14 or other device employing the wing assembly of this invention. The enhanced lift of the wing assembly advantageously provides improved lift, maneuverability and other desirable control characteristics to the aircraft.

The presence of the flap 24, when rapidly opened and moved to a position away from the wing top surface 34, gives the wing a large effective camber and thickness as compared to a wing without a flap. This has been found to dramatically improve wing performance because it enables the rapid generation and entrapment of a vortex behind the flap 24 and over the wing top surface 34. The resulting vortex is stabilized by the high circulation and axial flow components and generates the increased lift to the wing 16. The structure of the wing assembly 10 of this invention provides these desirable characteristics from the naturally occurring flow over the moderately swept delta wing 16, which is conically symmetric.

With the current interest in super-maneuverable aircraft, it is expected that the wing assembly will have application in this field as well as other areas in which increased lift, maneuverability and control through fluids, such as air and water, are desired. These other areas may include helicopter blades or ship propellers with flaps that may or may not have the delta shape described herein. Control fins on ships or submarines employing the delta flap concept is another anticipated area of application. For purposes of illustration, however, the operation of the invention will be described in connection with aircraft and air flow conditions.

In one aspect of the invention, the flap 24 is rapidly rotated during flight from a position where the flap is substantially retracted against and parallel to the top surface 34 of the wing 16 to a position where it is away from and substantially normal to the wing surface. The flap remains in this fixed or steady position during flight for a specified period of time. Deployment of the flap 24 in this manner has been found to increase lift by a factor of approximately two in laboratory experiments conducted by the inventor in a water channel at $Re = 2.7 \times 10^4$, where $$Re = \frac{\text{(velocity of wing)} \times \text{(maximum wing chord)}}{\text{kinematic viscosity of fluid}}$$

Rapid movement of the flap 24 to a position away from the wing 16 is important to produce a large stable vortex over the wing as quickly as possible. When operated suddenly, the flap gives increased lift to the wing, which then decreases slightly to a steady value. This steady value, however, is still much higher than the value without the flap.

Figure 4:
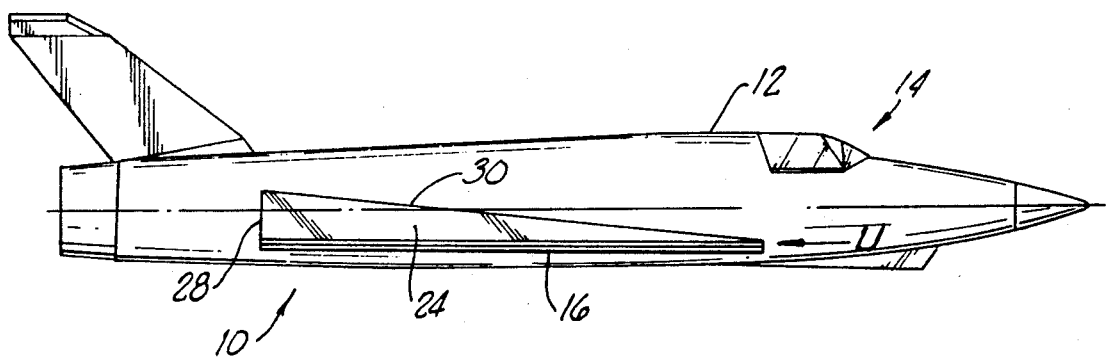
FIG. 4 is a side elevational view of the aircraft and wing assembly.
Figure 5:
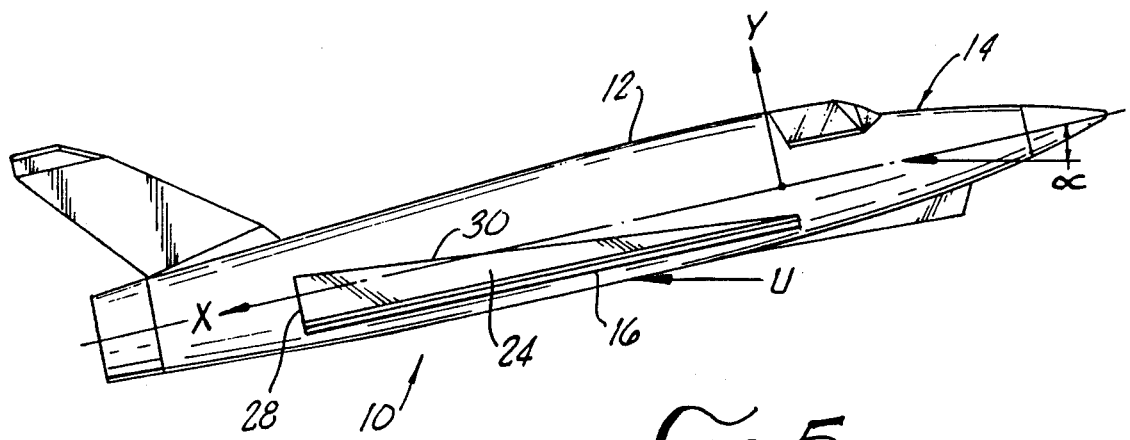
FIG. 5 is another side elevational view of the aircraft and wing assembly, similar to FIG. 4, with the aircraft travelling at a specified angle of attack.

The precise angle of the flap 24 with respect to the top surface 34 of the wing 16 may be selected as desired. Extensive studies and laboratory experiments conducted by the inventor have demonstrated that a fixed flap angle B of between approximately 65 and 90 degrees results in a wing having a separation vortex circulation with a value that is substantially twice the value of a wing without the flap. This translates into an approximate doubling of the lift. These studies and laboratory experiments have been conducted in the water channel referred to above, with the angle of attack $\alpha$ (alpha) of the aircraft at a moderate value of between approximately 10 to 15 degrees. FIG. 4 illustrates an elevational view of the aircraft travelling at a specified angle of attack $\alpha$ that is greater than zero degrees, where the coordinate axes X and Y are respectively parallel to and normal to the wing top surface 34. FIG. 3 illustrates a similar elevational view of the aircraft at an angle of attack $\alpha$ that is zero degrees.

In another aspect of the invention, the flap 24 is continuously and rapidly oscillated during flight from a position where the flap is substantially retracted against and parallel to the top surface 34 of the wing 16 to a position where the flap is away from and substantially normal to the wing surface. This oscillation or unsteady deployment of the flap 24 with respect to the wing 16 continues for a desired time period during flight. In one embodiment of the invention, the flap oscillates in a sinusoidal motion. The minimum and maximum flap angles B for each cycle of oscillation may be selected as desired. For example, the angle B of the flap with respect to the top surface of the wing may range from a point where $B_{min} = 0$ degrees to $B_{max} = 90$ degrees.

It has been found during the experiments and studies conducted by the inventor that a flap oscillation cycle where the minimum flap angle B is approximately 0 degrees and the maximum flap angle is approximately 70 degrees creates a large, leading edge vortex circulation having approximately three times the value of a wing without a flap. This represents a substantial enhancement of the separation vortex circulation over the situation without any flap, and also represents an increase in circulation of over one-third the value for the embodiment discussed above, in which steady state flap deployment is used. The opening and closing time of the flap may be constant or it may be varying in time. Similarly, non-sinusoidal motions may be employed. Deploying the flap on one wing differently than the flap on the other wing also may be used.

In addition to the increased lift, maneuverability and control characteristics provided by the wing assembly 10 of the present invention, other advantages are apparent. For example, in the aircraft application it is expected that the flight envelope of the aircraft will be improved. It also is contemplated that runway lengths may be decreased since the enhanced lift should enable the aircraft to leave the ground more quickly. These important advantages and others are anticipated, all as a result of the rapid deployment of the flap 24. Since the flap comprises only a relatively small area of the total wing surface, large motors and the like would not be necessary to deploy the flap. This would result in less power usage and only a minimal increase in the overall weight of the aircraft 14.

It will be appreciated from the foregoing that the wing assembly 10 of the present invention provides a wing 16 having a rapidly deployable flap 24 to significantly increase lift. During flow conditions over the wing, flap operation may be steady at a fixed flap angle or unsteady over time between a range of selected flap angles. This structure advantageously produces large, stable vortices over the wing with high circulation and axial flow components to generate rapid lift and other desirable maneuverability and control characteristics.

While a particular form of the invention has been illustrated and described, it will be apparent that various modifications can be made without departing from the spirit and scope of the invention. Accordingly, it is not intended that the invention be limited, except as by the appended claims.

I claim:

1. A wing assembly, comprising:
   a delta wing having a leading edge, a trailing edge and side edge;
   a delta flap smaller in size than the wing having a leading edge, a trailing edge and a side edge;
   means for rotatably connecting the entire leading edge of the flap to the leading edge of the wing; and
   rotating means for rotating the flap with respect to the top surface of the wing under flow conditions to create stable vortices with high circulation over substantially the entire wing and to thereby enhance wing lift.

2. The wing assembly of claim 1, wherein the leading edge of the wing and the flap are substantially the same length.

3. The wing assembly of claim 1, wherein the leading edge of the flap is shorter in length than the leading edge of the wing.

4. The wing assembly of claim 1, wherein the flap to wing semispan ratio is approximately 0.45 to 1.

5. The wing assembly of claim 1, wherein the flap to wing semispan ratio is less than 0.45 to 1.

6. The wing assembly of claim 1, wherein the flap is adapted to be rapidly rotated under flow conditions by the rotating means from a position where the flap is substantially against and parallel to the top surface of the wing to a position where the flap is away from and substantially normal to the wing surface.

7. The wing assembly of claim 1, wherein the flap is adapted to be rapidly rotated under flow conditions by the rotating means from a position where the flap is substantially against and parallel to the top surface of the wing to a fixed position 90 degrees or less away from the wing surface.

8. The wing assembly of claim 1, wherein the flap is adapted to be fixed by the rotating means at an angle of between 0 degrees and 90 degrees with respect to the top surface of the wing under flow conditions for a specified period of time.

9. The wing assembly of claim 1, wherein the flap is adapted to be fixed by the rotating means at approximately a 70 degree angle with respect to the top surface of the wing under flow conditions for a specified period of time.

10. The wing assembly of claim 1, wherein the flap is adapted to be continuously and rapidly oscillated during flow conditions by the rotating means from a position where the flap is substantially against and parallel to the top surface of the wing to a position where the flap is away from and substantially normal to the wing surface.

11. The wing assembly of claim 10, wherein the flap is oscillated in a sinusoidal motion.

12. The wing assembly of claim 10, wherein the flap is oscillated with respect to the top surface of the wing at an angle of between 0 and 70 degrees during flow conditions.

13. The wing assembly of claim 12, wherein the aircraft is an airplane.

14. The wing assembly of claim 1, wherein the assembly is used in combination with an aircraft.

15. The wing assembly of claim 1, wherein the flow created over the wing by the flap is substantially conically symmetric.

16. A method of operating a wing assembly of the type having a delta wing with a delta flap, wherein the entire leading edge of the flap is rotatably connected to the leading edge of the wing, the method comprising the steps of:
   setting the flap in an initial position substantially parallel to and against the top surface of the wing; and
   rapidly rotating the flap under flow conditions away from the top surface of the wing to produce a large, stable vortex with high circulation over substantially the entire wing and thereby increase its lift.

17. The method of claim 16, wherein the step of rapidly rotating the flap away from the top surface of the wing includes rotating the flap to a fixed position away from and substantially normal to the wing surface.

18. The method of claim 16, wherein the step of rapidly rotating the flap away from the top surface of the wing includes rotating the flap to a fixed position 90 degrees or less away from the wing surface.

19. The method of claim 16, wherein the step of rapidly rotating the flap away from the top surface of the wing includes rotating the flap to a fixed angle of between 0 and 90 degrees with respect to the wing surface.

20. The method of claim 16, wherein the step of rapidly rotating the flap away from the top surface of the wing includes rotating the flap to a fixed angle of approximately 70 degrees with respect to the wing surface.

21. The method of claim 16, wherein the step of rapidly rotating the flap away from the top surface of the wing further includes the step of continuously and rapidly oscillating the flap from a position where the flap is substantially against and parallel to the top surface of the wing to a position where the flap is away from and substantially normal to the wing surface.

22. The method of claim 21, wherein the flap is oscillated in a sinusoidal motion.

23. The method of claim 16, wherein the step of rapidly rotating the flap away from the top surface of the wing includes the step of continuously and rapidly oscillating the flap with respect to the top surface of the wing at an angle of between 0 and 70 degrees.

* * * * *